United States Patent [19]

Maki

[11] Patent Number: 5,257,266
[45] Date of Patent: Oct. 26, 1993

[54] COMPUTER AND COMMUNICATIONS SYSTEMS EMPLOYING UNIVERSAL DIRECT SPHERICS PROCESSING ARCHITECTURES

[75] Inventor: Stanley C. Maki, San Diego, Calif.

[73] Assignee: General Dynamics Corporation, Space Systems Division, San Diego, Calif.

[21] Appl. No.: 766,537

[22] Filed: Feb. 27, 1991

[51] Int. Cl.$^5$ .............................................. G06F 13/40
[52] U.S. Cl. ..................................................... 371/8.2
[58] Field of Search ................. 371/8.2; 395/200, 325; 364/DIG. 1, DIG. 2

[56] References Cited

U.S. PATENT DOCUMENTS

| | | | |
|---|---|---|---|
| 3,277,449 | 10/1966 | Shooman | 364/DIG. 1 |
| 3,320,594 | 5/1967 | Davies | 364/DIG. 1 |
| 3,757,312 | 9/1973 | Shore et al. | 340/173 AM |
| 3,936,806 | 2/1976 | Batcher | 364/DIG. 1 |
| 4,011,545 | 3/1977 | Nadir | 364/DIG. 1 |
| 4,306,286 | 12/1981 | Cocke et al. | 364/DIG. 1 |
| 4,317,196 | 2/1982 | Ulug | 370/94 |
| 4,402,045 | 8/1983 | Krol | 364/DIG. 1 |
| 4,415,963 | 11/1983 | Rippel et al. | 363/135 |
| 4,430,699 | 2/1984 | Segarra et al. | 364/DIG. 1 |
| 4,434,463 | 2/1984 | Quinquis et al. | 364/DIG. 1 |
| 4,503,535 | 3/1985 | Budde et al. | 371/11 |
| 4,514,807 | 4/1985 | Nogi | 364/DIG. 1 |
| 4,516,238 | 5/1985 | Huang et al. | 370/60 |
| 4,516,272 | 5/1985 | Yano | 455/607 |
| 4,519,028 | 5/1985 | Olsen | 364/DIG. 1 |
| 4,569,041 | 2/1986 | Takeuchi et al. | 370/60 |
| 4,593,273 | 6/1986 | Narcisse | 340/539 |
| 4,598,400 | 7/1986 | Hillis | 370/60 |
| 4,625,306 | 11/1986 | Newman | 370/60 |
| 4,644,526 | 2/1987 | Wu | 370/30 |
| 4,949,340 | 8/1990 | Smith et al. | 371/812 |

*Primary Examiner*—Thomas M. Heckler
*Attorney, Agent, or Firm*—Frank D. Gilliam; John R. Duncan

[57] ABSTRACT

Communication and computer interconnecting systems using Universal Direct Spherics (Unidispherics) philosophy makes it possible to transmit and store data in an efficient and rapid manner. The system architecture embodies a plurality of communication sites (nodes) which interact with each other by a symmetrical arrangement of great circles on a sphere or their equivalent. Each intersection of two great circles can be a node for linking processors, bulk memories, and in/out units (IND). In addition to the insertion of two great circles on a sphere, there are five other links, four along each of the great circles connected to the nodes at the adjacent great circle intersections and one cross-link to the node diametrically opposite on the sphere.

4 Claims, 7 Drawing Sheets

FIGURE 16

COMPUTER AND COMMUNICATIONS SYSTEMS EMPLOYING UNIVERSAL DIRECT SPHERICS PROCESSING ARCHITECTURES

BACKGROUND OF THE INVENTION

The present invention relates to communications and computer systems, and more particularly to system architecture which provides a broad spectrum of services simultaneously to a large number of devices and users in an efficient and rapid manner.

There are several well known approaches to the interconnection of a plurality of multi-processors. A short explanation of these known approaches are described in the following paragraphs.

The most current and widely proposed system is of the "Bussed multi-processor" type. As the name applies, this system comprises a number of processors on a bus(ses). There is a contention for bus communications, as the number of processors is increased, the bus data band width may become the limiting factor. A global memory is commonly employed in this architecture. Increasing the number of processors can also limit memory access. There is a lack of flexibility for system expansion. Quite often the bus(ses) data range and protocol complexity hinder performance. Pooled processors is terminology frequently applied.

Another system is referred to as "Pipeline Processing". This is a means of increasing throughput at a processing site without adding more bus accesses. A processing task broken into concurrent sequential units to speed up performance. Each processor performs its tasks and passes it to the next processor in the chain. This could also be implemented on a bus system, however, it could result in bus saturation. Pipeline processing is the basis for vector processing.

Another system is referred to as the "Transputers". Transputers is a processor node with its own local memory and four external serial communication links to other transputers or input/output links. With four external communication links it is readily configured into a pipeline or an array system. Since the number of communication channels and memory increases with the number of processors, it will not become communications or memory bound. For non-array or non-pipeline processing, one of the short comings of the transputer implementation is that for data transfer between two separate nodes, the connecting nodes become involved in communications handling, thereby limiting the connection nodes processing efficiency. A special programming language OCCAM has been developed for transputer concurrent processing.

Another system for processing is referred to as the "Systolic Processing" Systolic processing is performed with a two dimensional array of processors. The transputer implementation is a special case systolic processor. The systolic processor is well suited for array type of problems such as data filtering and image processing. A systolic processor node receives data from its upper and left neighbors and passes results on to it's lower and right neighbors. For nonsymmetrical operations, the processing nodes become overly involved in communications.

Still another system for processing is referred to as the "Hypercube". The hypercube is an extension of the systolic processing to more dimensions. Systolic processing is a two dimensional special case of the hypercube. The number of communication channels per hypercube depends on the hypercube dimension. Communication capability and the number of nodes increases for higher dimension hypercubes. The hypercube gives more flexibility for various problems than the systolic processor. The hypercube has the same problems as the systolic processor with wasted pass through nodes for non-compliant geometric processing solutions.

Still another system is referred to as "Stargraph Processing". Stargraph is like hypercube network except it uses less link per node. A stargraph of order four has three links per processor node and provides twenty four node processors with 72 links whereas a hypercube of order four has four links per processor node and has sixteen node processors with 64 links. A stargraph of order five provides 120 node processor with 480 links whereas a hypercube of order five has thirty two node processors with 160 links. A stargraph of order six provides 720 node processors with 3600 links whereas a hypercube of order six has sixty four node processors with 384 links.

Yet another system is referred to as the "Banyan Tree Processing". A Banyan tree network has two input and two output links plus a processor link at each node. Various versions exist such as the Butterfly network which is formed like a cylinder with processors along the input seam and memories along the output seam; Also the Torusnet which has the network in the form of a doughnut with processors at every node.

The processing approach of the present invention overcomes the disadvantages of other processing systems and adds additional desirable features.

SUMMARY OF THE INVENTION

This disclosure describes a new processing configuration referred to as "Unidispheric Processing". The term "Unidispherics" is derived from Universal Direct Spherics where the word definitions imply the performance of Unidispherics processing:

Universal—Unrestricted fitness or adaptability, all embracing range of abilities.

Direct—Straightforward, to indicate the distinction of having or being the shortest course, to guide or supervise.

Spherics—The geometry and trigonometry of figures on the of a sphere.

The Unidispherics processing configuration uses an independent communication network (ICN) arranged on a spherical surface (for the purpose of visual clarity) with four links going on the spherical surface to adjacent modes on the same great circles (for symmetrical unidispherics), and one cross link going to the diametrical opposing node. This assures high connectivity with a minimum number of links in the path between any two nodes, while limiting the number of links to two and one half times the number of nodes. The processing, memory and input/output operations are separate functional layers implemented with Independent Node Devices (IND) consisting of an Independent Processing Device (IPD), an Independent Memory Device (IMD) and an Independent Input/Output Device (IOD) which are attached (no more than one per node) to the communication nodes. Both symmetrical and non-symmetrical INC can allocate a portion of its nodes to a systolic array with one link length between the array nodes The processing approach of the present invention will overcome the disadvantages of other processing systems and add desirable features to the computer networking art.

An object of this invention is to avoiding processor tie-up in the communication problem.

Another object of this invention is to avoiding communication link limiting and lack of memory access.

Another object of this invention is to avoiding limitations due to local memory.

Another object of this invention is to provide flexibility for both array type processing and irregular processing.

Still another object of this invention is to minimize the number of communication nodes in any data path.

Still another object of this invention is to minimize the number of communication links in the system.

Still another object of this invention is to minimize communication hardware portions of total hardware cost.

Still another object of this invention is to provide re-configuration capability for failed units.

Still another object of this invention is to provide high performance capability, processing, memory access and data transfer.

Yet another object of this invention is to provide the ability of working with popular software languages.

A further object of this invention is to maximize independence of communications network software and hardware from processors software and hardware.

These and other objects and advantages of the present invention will become apparent to those skilled in the art after considering the following detailed specification in which the preferred embodiment are described in conjunction with the accompanying drawing Figures.

DESCRIPTION OF THE PREFERRED EMBODIMENTS

Referring now to the various drawing Figures. Referring now specifically to drawing FIG. 1, the communication system of the instant invention is directed to communication nodes and links interconnecting a communication layer 10, a processing layer 12, a memory layer 14 and an input/output layer 16 to create an Independent Communications Network (ICN). There are Independent Node Devices (IND) of three types; Independent Processing device (IPD), Independent Memory device (IMD) and Independent Input/Output device (IOD).

Figure 1:
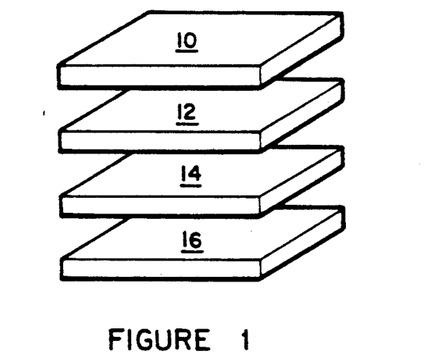
FIG. 1 depicts the functional areas of the invention.

Isolating the processing bulk memory 14 and in/out layer 16 into Independent Node Devices (IND) requires that the ICN is the integrating element (hardware wise) for the processing system.

In a systolic array as mentioned above, communications are good between adjacent nodes, but are poor between nodes near opposite edges of the array. Communications and availability in a linear bus system is improved by closing it into a ring. Similarly it can be improved for a systolic array by connecting two edges and forming a cylinder. However, this still leaves poorer communications between nodes near the top and bottom of the cylinder.

Figure 2:
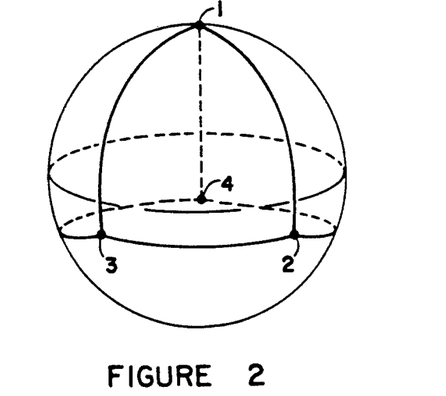
FIG. 2 is a four node spheric showing of the communication network of the invention.
Figure 3:
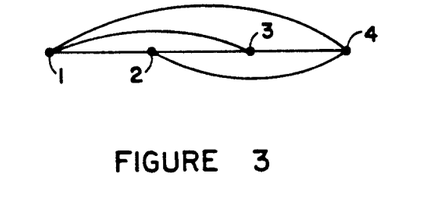
FIG. 3 is a pseudo planisphere showing of the network of FIG. 2.

In the ICN Unidispherics processing concept the interconnections are mapped on a spherical surface. This will maximize connectivity between various communication nodes. An example is shown in FIG. 2 for a simple four node configuration. The system of the present invention is accomplished by mapping segments of a great circles on a spherical surface, hence the adoption of the term spherics in the term Unidispherics to describe the communication system of the present invention. A pseudo plainsphere (closely resembling a plane projection of the sphere) of the four node network of FIG. 2 is shown in drawing FIG. 3. All communication paths (a path is the set of links required to go from a source node to a destination node) are one link maximum in this example, providing connectivity.

Figure 4:
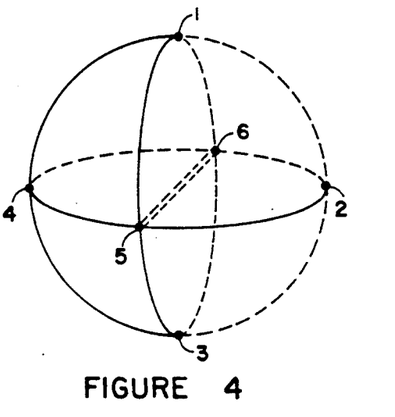
FIG. 4 is a six node spheric showing of the communication network of the invention.
Figures 5, 6:
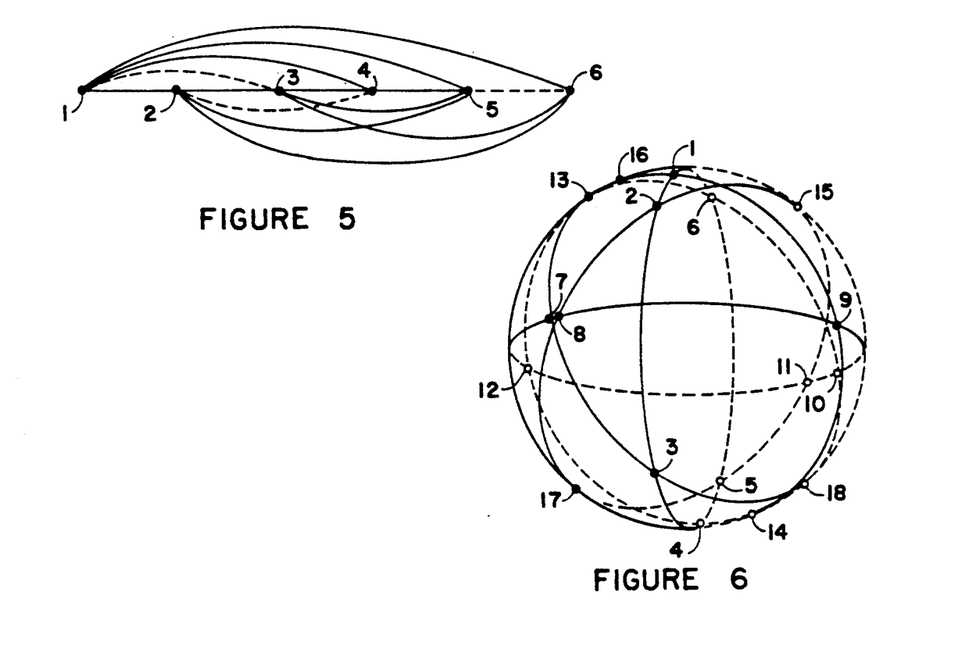
FIG. 5 is a pseudo planisphere showing of FIG. 4.
FIG. 6 is a eighteen node spheric showing of the communication network of the invention.

An example of a six node Unidisphere is shown in drawing FIG. 4 and its pseudo plainsphere is shown in drawing FIG. 5. With only four interconnects/node, there are three paths (1-3, 2-4 and 5-6) that are two links in length, Increasing the number of links from twelve to fifteen makes the maximum path length one link. There are many two link paths available in the case of a one link path failure.

Figure 7:
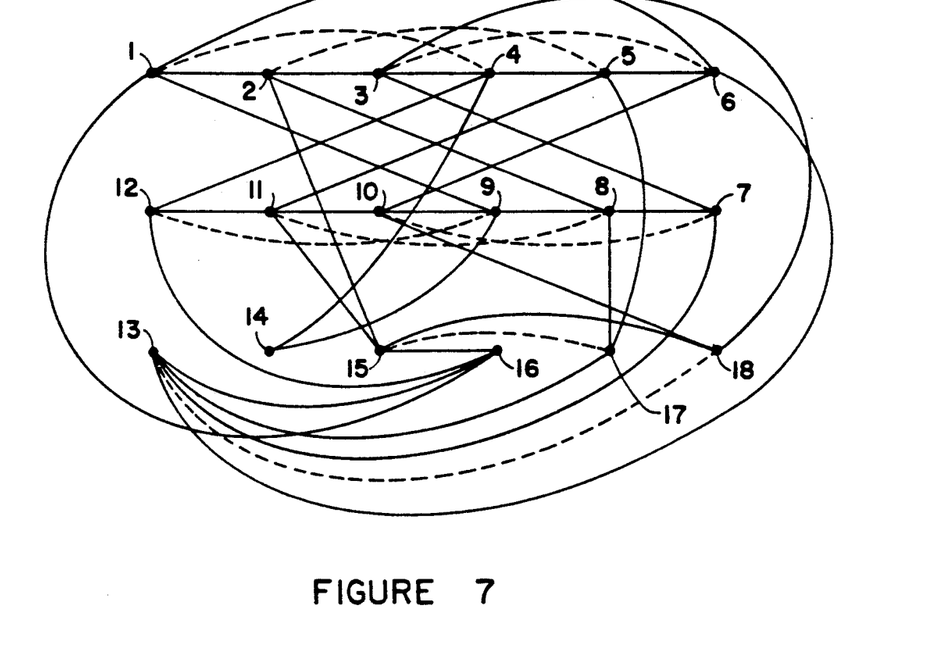
FIG. 7 is a pseudo planisphere showing of FIG. 6.
Figure 8:
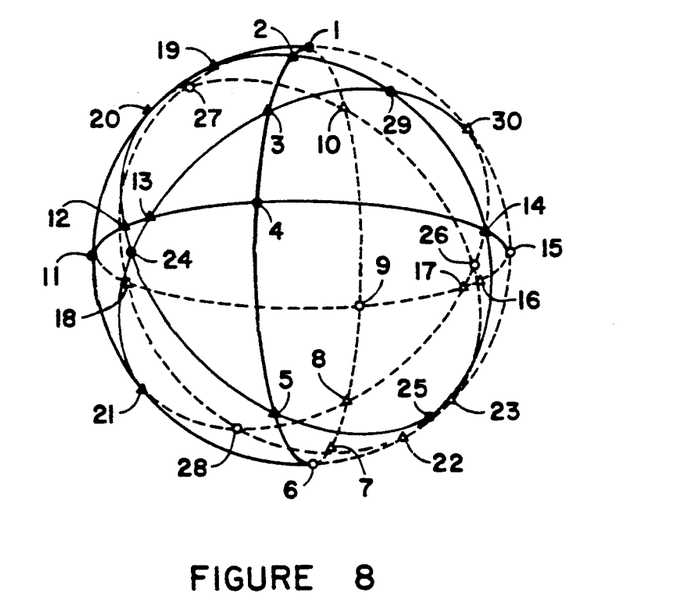
FIG. 8 is a thirty node spheric showing of the communication network of the invention.
Figure 9:
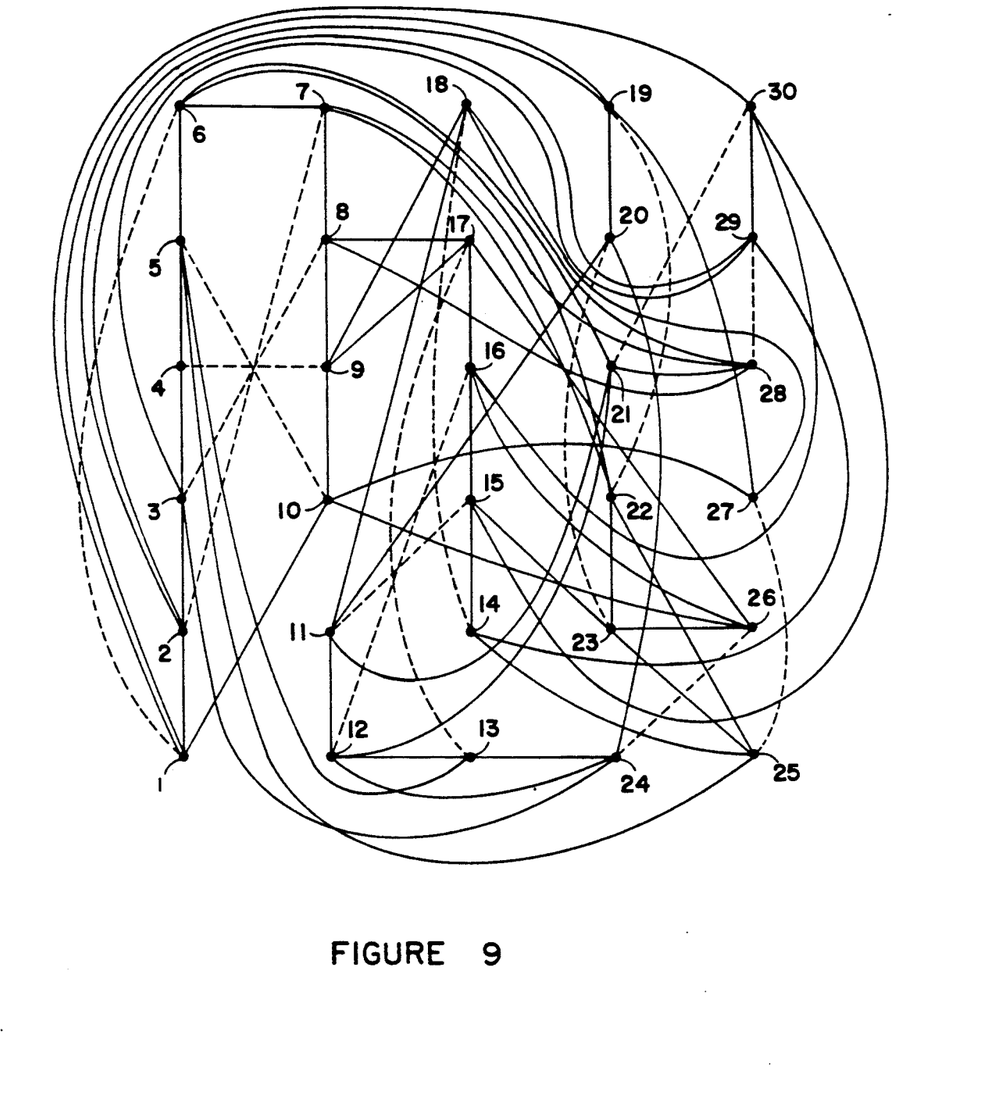
FIG. 9 is a showing of a pseudo planisphere showing of FIG. 8.

The use of cross links (a twenty-five percent increase in the number of links) substantially improves interconnectivity in larger communication nets. This is shown in drawing FIG. 6 for an eighteen node Unidispherics ICN and in drawing FIG. 7 for its pseudo plainsphere. For efficient cross linking, it is desirable to have symmetric Unidispherics ICN so the cross link is to opposite poles on the sphere. This is the case for the six, eighteen and thirty node ICN's shown in the last mentioned drawing Figures. The thirty node ICN is illustrated in drawing FIGS. 8 and 9. It is apparent that the eighteen node ICN is a selectively de-populated version of the thirty node ICN. From the examples it can be seen that it is very difficult to visualize a high interconnectivity on a two dimensional drawing.

Figure 10:
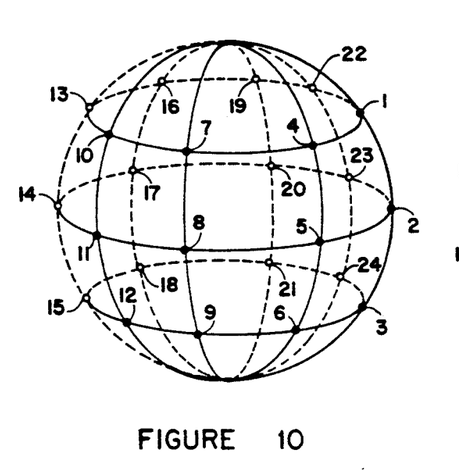
FIG. 10 is a twenty four mode non-symmetrical showing of the communication network of the invention with the cross-links not shown.
Figure 11:
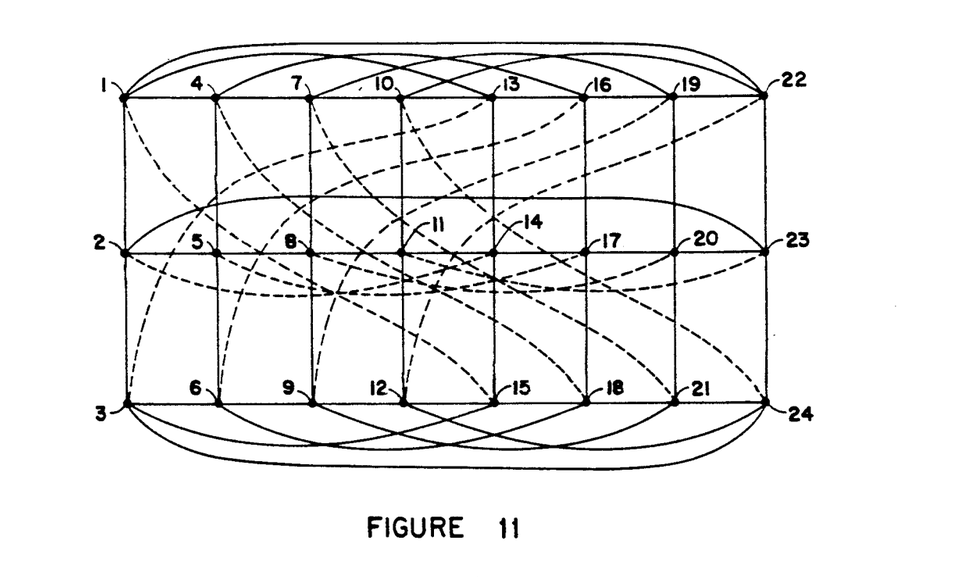
FIG. 11 is a showing of a pseudo planisphere showing of FIG. 10 with the cross-links shown.

If a portion of a Unidispherics system is used for systolic array processing, the selected nodes will require some two and/or three link paths. If the system will be doing array processing continually, then a portion can be specifically set aside for that purpose as shown in drawing FIG. 10 and 11 for an ICN that could support a two times two to a three times eight systolic array. The interconnectivity is not as good as for spherically symmetric ICN, requiring a six link maximum path length (vs. five link) with four interconnects/node for twenty four (vs. thirty) nodes. The cross link additions improve it to a three link maximum path length like the larger (thirty) nodal system. For a thirty node non-symmetric spherical ICN, the ICN could be setup to support arrays from two times two to five times six for example with a single link interconnects in the systolic array portion. The twenty four node non-symmetrical spherical ICN could be arranged to support two times two to four times six arrays.

Figure 11A:
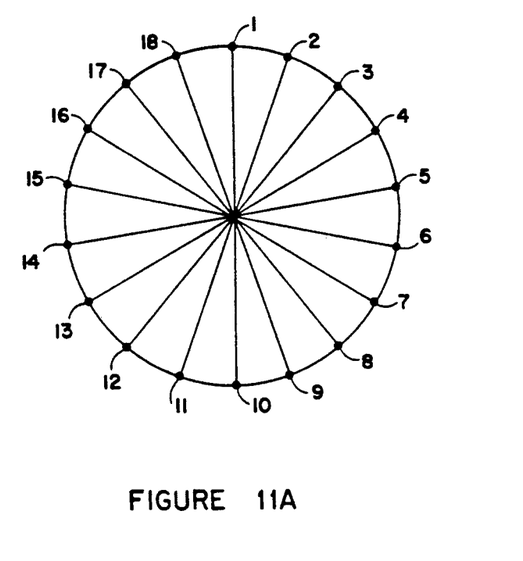
FIG. 11A is an eighteen node two dimensional undisphere reduced to network shown.

For some applications with limited number of nodes, and with lower data rate bandwidth requirements, a two dimensional reduction of the Undispherics is shown in FIG. 11A. It is basically in the form of a ring with cross-links. However it uses Unidispherics message protocol and communication nodes, not ring bus protocol.

The number of nodes can be increased without limit in either the symmetric or non-symmetric ICN's while using only two and one half times the number of nodes links including cross links. For instance as follows:

| Number of Symmetric Great Circles | Maximum Number Of nodes | Maximum Number of links |
|---|---|---|
| 7 | 42 | 105 |
| 8 | 56 | 140 |
| 16 | 240 | 600 |
| 40 | 1560 | 3900 |

It should now be apparent that the Unidispherics Processing Configuration use an Independent Communication Network (ICN) arranged on a spherical surface (for visualization purposes) with four links going on the spherical surface to adjacent nodes on the same great circles (for symmetrical Unidispherics), and one cross link going to the diametrically opposing node. This assures high connectivity with a minimum number of links in the path between any two nodes, while limiting the number of links to two and one half times the number of nodes. The processing, memory and input/output operations are separate functional layers implemented with Independent Node Devices (IND) consisting of Independent Processing device (IPD), Independent Memory Device (IMD) and Independent Input/Output Device (IOD) which are attached (no more than one per node) to the communication nodes. Both symmetrical and non-symmetrical ICN's can be configured with as many nodes as necessary. The symmetrical ICN has a better connectivity than the non-symmetrical ICN. The non-symmetrical ICN can allocate a portion of its nodes to a systolic array with one link length between the array nodes.

UNIDISPHERICS PROCESSING IMPLEMENTATION

Figure 12:
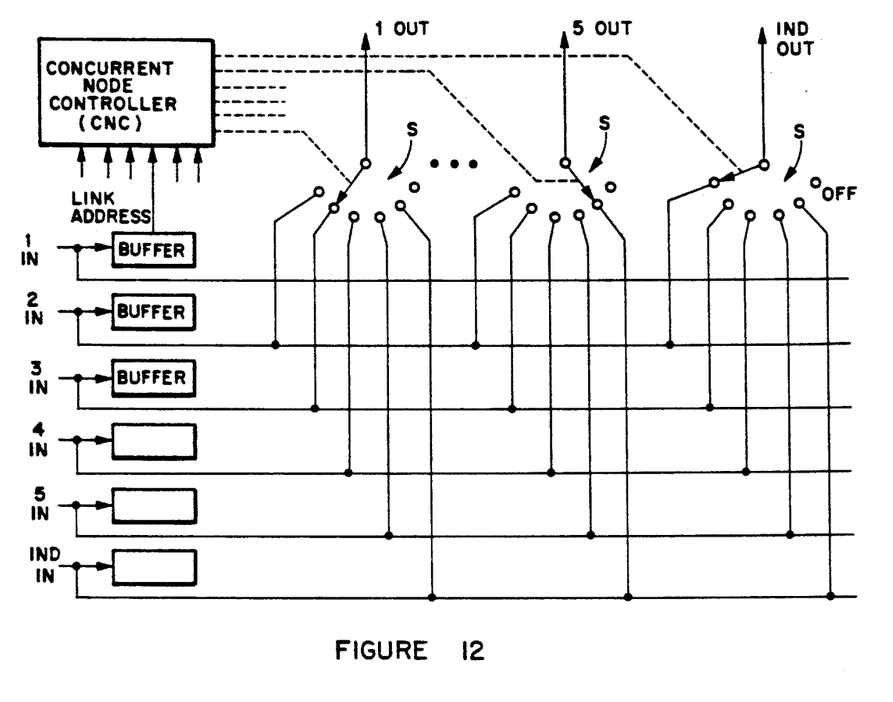
FIG. 12 depicts a schematic showing of a communication node message forward switching circuit of the invention.
Figure 13:
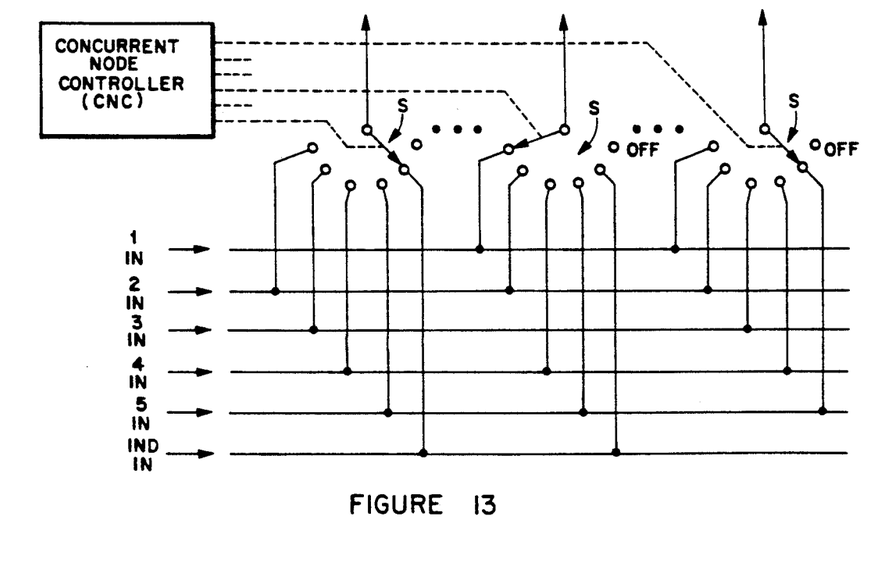
FIG. 13 depicts a schematic showing of a communication node and link termination system.

A wide number of possible implementation methods exist for the ICN. For this implementation, a general variable packet length message consisting of sixteen bit words will be utilized. Since it is much simpler to implement unidirectional solid state switching than bi-directional switching, unidirectional switching will be employed. A return path will be provided for each forward path to easily accommodate different speed IND's at the source and destination nodes by use of a "ready" response message for each data word. Each communication node will have the equivalent of a six pole switch S in the forward path (FIG. 12) and six pole switches S in the return path operated in the image of the forward path (FIG. 13). These will provide all necessary switching to/from the five communication links and the IND.

Figure 14:
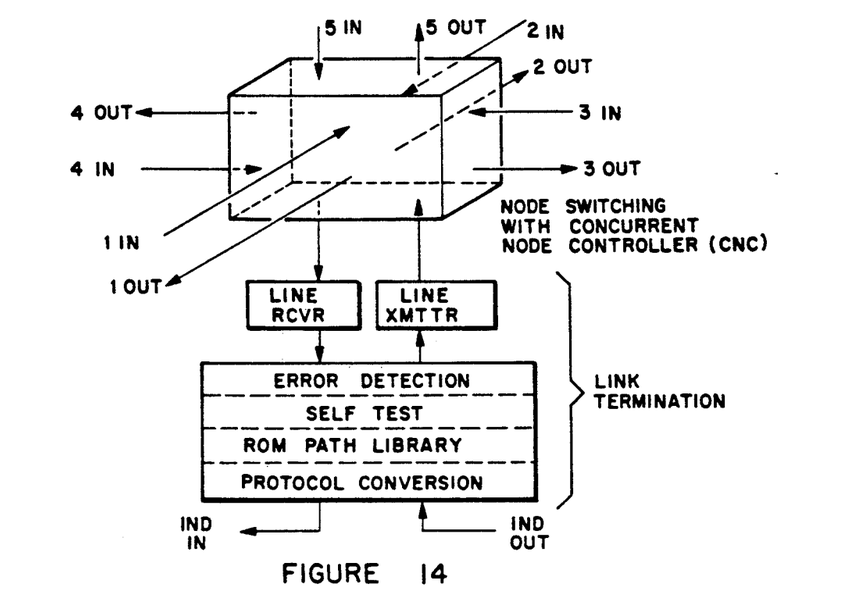
FIG. 14 is a schematic showing of a path route example from node thirty to node seventeen of a thirty node ICN.
Figure 15:
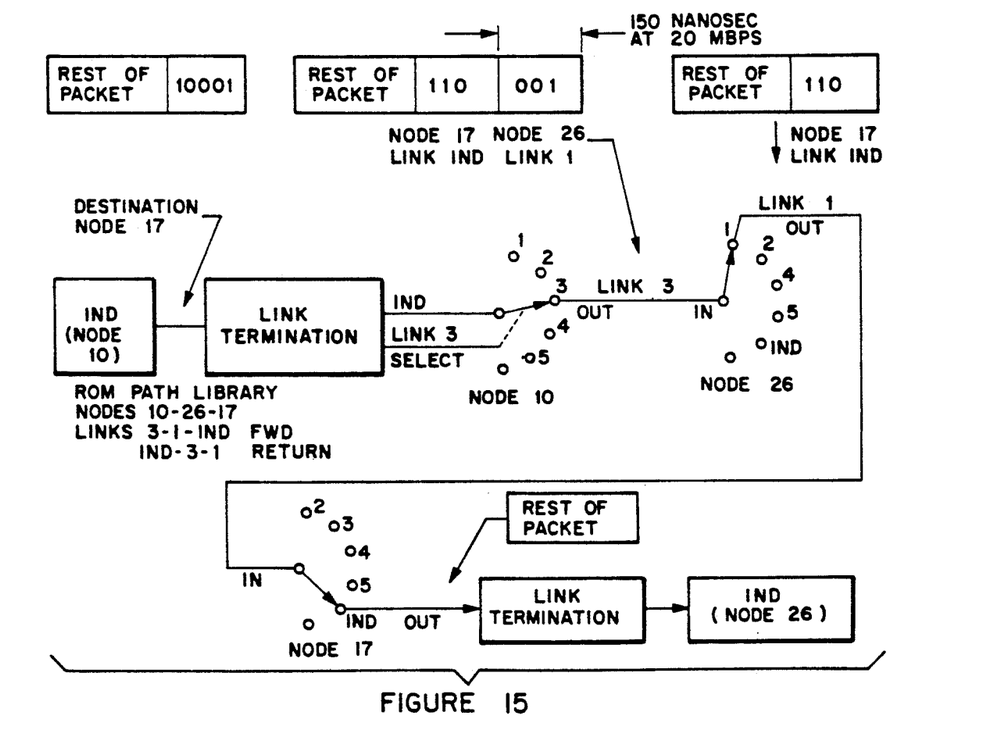
FIG. 15 is a schematic showing of a path routing example from node ten to node seventeen of a thirty node ICN.

A fast eloquent method for signal path selection and activation is used. In drawing FIG. 15 is shown an example routing from source node ten to destination node seventeen for a thirty node Unidispheric. From drawing FIGS. 8 and 9 it can be seen there is a two link path through node 26. The IND at node 10 will in its packet include the destination node address, which in the example (FIG. 15) is shown as binary coded. The link termination for the source node IND will search the ROM path library for the shortest path to the destination node, which will be described with sequential three bit numbers, each three bit number identifying the link number to the next node. In the example, it is link three from node 10 to 26, link 1 from node 26 to 27, and IND link at node 17. The link termination at node 10 directly selects link 3, whereas the Concurrent Node Controller (CNC) (FIG. 14) at the other nodes decodes the first three bits on the receiving link to select the transmitting link to the next node. A one link path would have a small delay of 150 nano seconds for three bits at 20 MBPS. A two link path delay is 300 nano seconds (as in the example) and a three link path delay is 450 nano seconds.

If a link at a node in the path selected by the source node is busy, that node CNC will send back a "busy" message and the source node will select an alternate path not using that link.

This is deemed simpler and as fast as having that busy link node CNC receive all the node switch settings, select a new path, strip the old node settings and insert the new node switch settings.

At each node in the path, the 3 switch settings bits for that node are stripped from the front end and only the switch setting bits for the remaining nodes in the path are transmitted onward. At each node (except the source node) then there is the 3 bit switch set buffer delay of 150 nano seconds at 20 MBPS plus the switch operate time plus the transmission delay through the node circuitry.

The Unidispherics ICN provides ample redundancy. There is at least half an order of magnitude more signal paths available than are required. Data bandwidth also is substantial with only links totaling two and one half times the number of nodes.

During idle time each link termination will conduct self test of its node links. Each packet will have an error detection code word. If a link has a permanent failure (as observed by repetitive failures), that link failed status will be sent to all link terminations status memory so paths containing that link are removed from availability.

When the destination node IND has received the complete message and checked it for errors, it will send a "message OK/$\overline{OK}$" response to the source node IND.

The path links will remain activated long enough after the forward message data bit transitions stop, for the response message to be sent. After that the links will become available for another message path.

The communication node consists primarily a simple switching device. Each link termination contains the bus protocol circuitry and ROM path library as in FIG. 14.

Independent Processing Device (IPD)

The IPD or its link(s) to its communications node will not be described in any detail because its configuration depends on the particular system application requirements. If a single string IPD is used, the IPD link to the communication node will be single string as shown in FIG. 14. If a self checking pair IPD is used, then dual redundant links and node switches will be utilized. The processor thruput would be used for the application. In general, what can be said about the IPD is that it will have a cache memory to reduce traffic to the bulk memory IMD, and that its operating system software and recent data will be stored in bulk memory for another IPD to take over its function in case of failure. Each IPD will have self failure detection capability.

Independent Memory Device (IMD)

As with the IPD, the IMD specifies depend on particular application. In IMD provides a bulk storage capability. If its a dual ported device, the ports could connect to separate communication nodes. Since the IMD has serial data channels, the IPD's will rely on their cache memories for the very high speed memory accesses.

Independent Input/Output Device (IOD)

The IOD is application specific. Redundancy can be applied to the IOD by using separate communication nodes, or by building in redundancy at one communication node.

INC Integration

Functional segregation of communications, processing, memory, and input/output facilitates the provision of a flexible, high speed connectivity that is not effected by the processor tasks with other systems (e.g. Transputer) where the processor is intimately involved with the communications provisions. The goals that were established for the Unidispherics Processing have been largely accomplished.

Unidispherics Processing Physical Arrangement

It is important to keep the communication link short. A spherical arrangement of hardware is not particularly practical. The most convenient arrangement is a hollowed-out cylinder or a multi-sided rod type of configuration. The INDs would be located at the outer surface of the cylinder or multi-faced rod, and the ICN would be on the interior surface. In drawing FIG. 14, links 1,2,3 and 4 would generally tend to be routed at a constant radius from the cylinder center, while link 5 would generally be radially routed as would the IND link termination.

Unidispherics Processing Software

The bulk of the system software would reside in IPDs with major modules stored in the INDs along with current reconfiguration data. The software language would be selected, depending in part on the IPD and the IND designs. For message transmittal, the source IND would send to its link termination the destination address. The link termination would select a path to the destination mode and send the 3 bit switch selection for each node down the path. The link termination would contain the software/hardware involved with communication path operation such as error detection code generation and check (and correction if applied), self test, formatting and so forth. The software for the integrating element, the ICN, is kept simple while retaining the capability for fast, high redundancy communication networking with multiple path selection availability. The selection process would pick a single link path over a two link path, a two link path over a three link path and so forth. The selection within a given path length group would be rotated.

Special Add-Ons

The Unidispherics Processing System is adaptable to containing special add-ons such as a parallel high speed bus from processor(s) (IPDs) to bulk memory(s) (IMDs). These types of add-ons would be hardware configured outside of the ICN, however, they may utilize the ICN message transmission function for purposes like control.

Link Transmission Characteristics

The use of 1,2 or 3 link paths limits transmission length and delays. The communication node switches would be implemented with logic gates which provide link-to-link impedance isolation. A serial data rate in the order of at least 20 MBPS should be achievable on these short point-to-point links.

Concurrent Node Controller and Switching Logic

Figure 16:
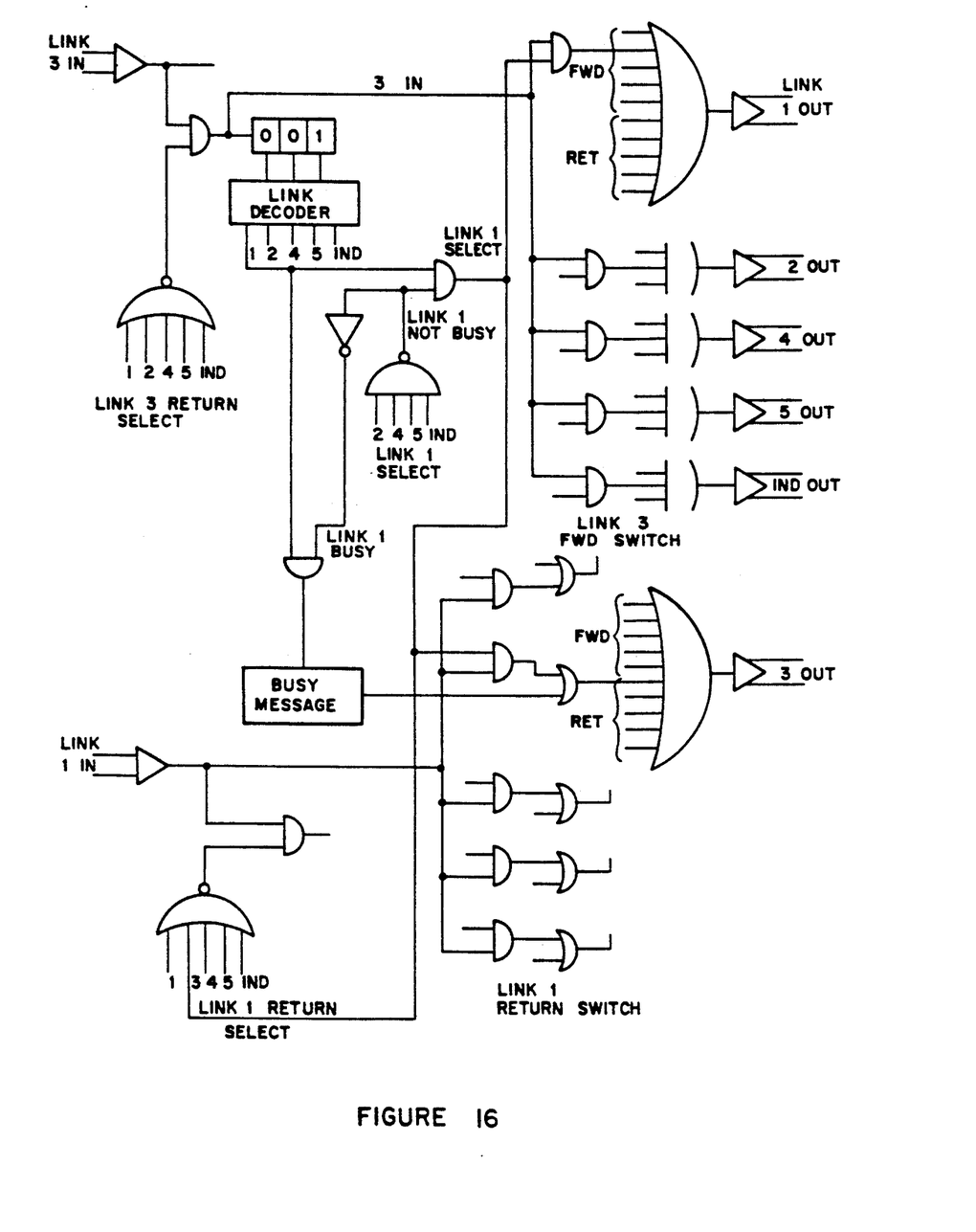
FIG. 16 is a schematic showing of a switching logic path for node twenty six in example path.

The relatively simple Concurrent Node Controller (CNC) and switching logic could be implemented with a microprocessor and software or with special logic. For fast operation, special logic is utilized. In drawing FIG. 16 some of the logic functions are illustrated for node 26 which for the forward path has link 3 in and link 1 out. The upper half of drawing FIG. 16 is associated with the forward path switching and the lower half with return path switching (link 1 in and link 3 out). The first 3 bits in the packet arriving on link 3 enter the buffer (inhibited from doing so if link 3 is used for return path at other times for other messages) and are decoded for outgoing link selection (in this example link 1). Link 1 is selected, provided it is not already busy. If link 1 is busy, a "busy" message is sent back on link 3 out. Link 1 out can be selected by 1 of 5 forward path requests or 1 of 5 return path requests.

The "busy" interlocks prevent more than one request at any time. The same is true of the other link outputs selection. The selection of link 1 for output automatically selects 3 out for the return path.

The link logic for link 3 in is repeated for the other 4 link inputs. For the IND in link, the link termination directly requests the output link for the source node rather than using the buffer and link decoder. One of six forward switches (6 gates) and one of six return switches (6 gates and 6 ":or" logic) are shown. Logic functions not shown include "end of packet reset" and "return path termination timeout", also "clock and bit sync".

Distributed Unidispherics Processing

If it is desired to have wide physical distribution of the nodes, fiber optic communication links easily capable of 50 MBPS or higher data rates can be employed. The links circuitry is more complex requiring emitter drivers, detector sensing, fiber optic mating and higher speed interfacing circuitry. The added transit delay is approximately 1.0 nanosec per foot of fiber optics. With the message/response (ARQ) protocol, different amounts of transmission delay with various length fiber optic communication links do not cause any synchronization problems.

While the present invention has been described with reference to particular embodiments thereof, it will be understood that numerous modifications can be made by those skilled in the art without actually departing from the scope of the invention. Accordingly, all modifications and equivalents may be resorted to which fall within the scope of the invention as claimed.

I claim:

1. An improved communication network for a fault tolerant communication system for interconnecting in a computer a maximum plurality of independent node devices comprising:

at least two or more busses in the shape equivalent of a continuous circle;

a plurality of connectors electrically interconnected to said at least two or more busses with each connection forming a site node, a plurality of site nodes are directly linked to at least one other node, each of the nodes being electrically connectable to each other, to a computer internal communication layer, processing layer, memory layer and an input/output layer; and means for selectively interconnecting said plurality of site nodes to each other, said communication layer, processing layer, memory layer and input/output layer.

2. The invention as defined in claim 1 wherein a portion of said plurality of nodes are interconnected to only one other node.

3. The invention as defined in claim 1 wherein the number of said plurality of connectors is at least three.

4. The invention as defined in claim 1 additionally comprising a plurality of cross-links connected between said at least two or more busses.

* * * * *